(12) United States Patent
Challender et al.

(10) Patent No.: US 6,871,882 B2
(45) Date of Patent: Mar. 29, 2005

(54) BALL-AND-SOCKET FLUID COUPLING WITH PRIMARY AND SECONDARY RETAINER STRUCTURES

(75) Inventors: Gary Bernard Challender, Grass Lake, MI (US); Thomas A. Parrish, Parma, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/427,841

(22) Filed: May 1, 2003

(65) Prior Publication Data

US 2004/0217590 A1 Nov. 4, 2004

(51) Int. Cl.[7] ................................................ F16I 27/04
(52) U.S. Cl. ...................................... 285/261; 285/262
(58) Field of Search ................................ 285/261, 262, 285/267

(56) References Cited

U.S. PATENT DOCUMENTS

| | | | |
|---|---|---|---|
| 373,072 A | * | 11/1887 | Jarvis ........................... 92/167 |
| 386,547 A | | 7/1888 | Martin |
| 866,061 A | | 9/1907 | Phillips, Jr. |
| 882,836 A | | 3/1908 | McLaughlin |
| 918,443 A | | 4/1909 | Greenlaw |
| 979,513 A | | 12/1910 | Koenig |
| 2,465,373 A | | 3/1949 | Hall |
| 2,813,731 A | | 11/1957 | Tracy et al. |
| 2,824,758 A | | 2/1958 | Cattrell |
| 2,921,803 A | | 1/1960 | Tracy et al. |
| 3,165,339 A | | 1/1965 | Faccou |

* cited by examiner

Primary Examiner—John R. Cottingham
(74) Attorney, Agent, or Firm—Honigman Miller Schwartz and Cohn LLP

(57) ABSTRACT

An articulating ball-and-socket fluid coupling includes a ball body, a socket body, a primary retainer structure, an annular seal assembly and a secondary retainer structure. The primary retainer structure has a shaft extending through the ball and socket bodies to connect the ball body and the socket body together while permitting the ball body and the socket body to articulate relative to each other. The secondary retainer structure includes an annular member disposed in a ball receiving conduit portion of the socket member and connected to the socket body at or adjacent to an opening into the ball receiving conduit portion. The annular member has an inner secondary retainer diameter less than a spherical diameter of a partially spherical exterior surface defining a ball portion of the ball body so that the secondary retainer structure retains the ball body and the socket body connected if the primary retainer structure fails.

29 Claims, 3 Drawing Sheets

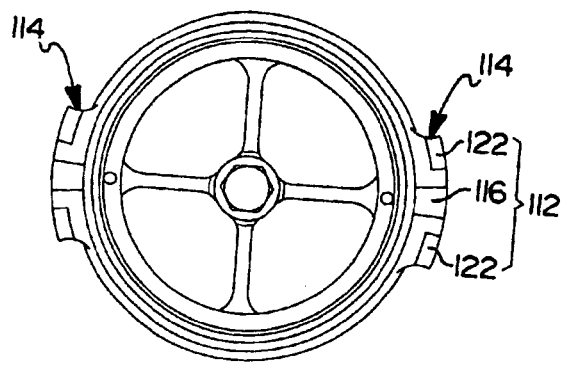
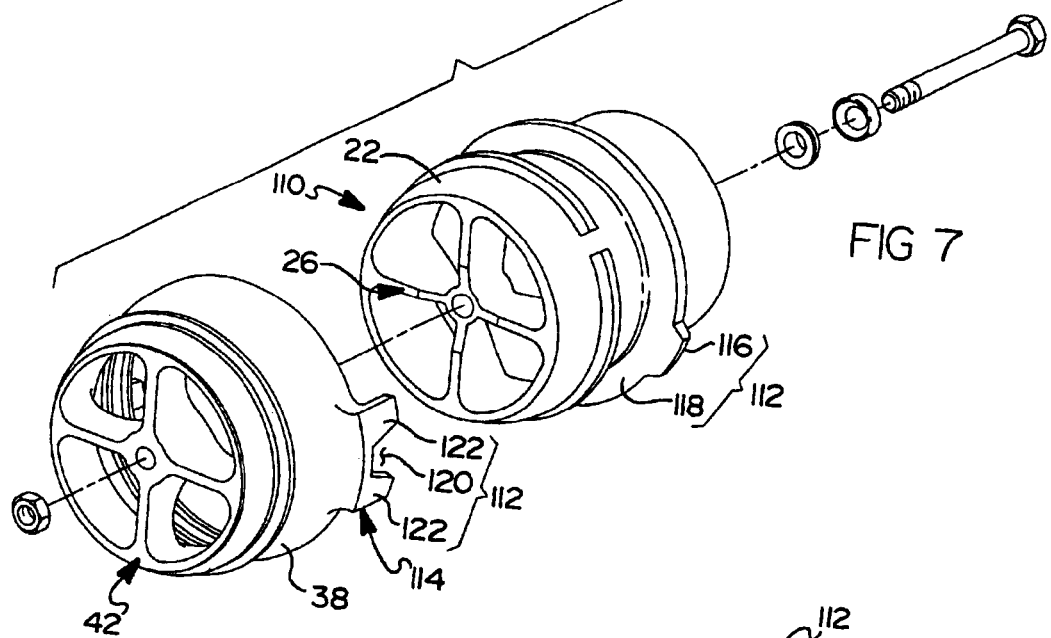
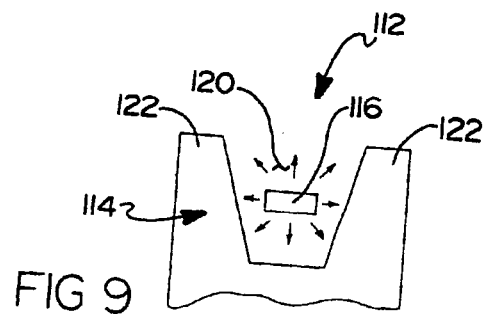

BALL-AND-SOCKET FLUID COUPLING WITH PRIMARY AND SECONDARY RETAINER STRUCTURES

FIELD OF THE INVENTION

The present invention relates to a ball-and-socket fluid coupling. More particularly, a ball-and-socket fluid coupling is disclosed having a primary retainer structure and a secondary retainer structure.

BACKGROUND OF THE INVENTION

Many types of articulating ball-and-socket fluid couplings are commonly known in the art. One known coupling teaches an articulating ball-and-socket joint for coupling pipes and tubes with the ball being held in contact with the socket by an internal fastening device. Another known coupling teaches an articulating pipe or hose coupling that includes a socket member, a ball member and a coupling rod arranged in a slotted cross-piece having a gooseneck configuration at one end. A nut is threaded onto the rod to connect the socket member and ball member together.

Although the commonly-known articulating ball-and-socket couplings are useful in many applications, their use is not optimum for certain applications where potential coupling failure is an issue. One such environment involves coupling use in aircraft. It is known in the art under certain environmental and operational conditions for the ball and socket members to become disengaged from one another because the fastening device holding the ball and socket members together fails. For example, in the above-described articulating ball-and-socket couplings, it is possible that the nut might unwind from the threaded rod resulting in failure of the articulating ball-and-socket coupling.

Attempts to minimize the likelihood of coupling failure have been made in the prior art. For example, two nuts are sometimes engaged with the threaded end of the rod. However, using two nuts continues to raise concerns for use in aircraft.

It would be beneficial to provide a ball-and-socket fluid coupling with an improved retainer structure for retaining the ball member and socket member connected together. It would also be beneficial to provide a ball-and-socket fluid coupling having redundant retainer structures for retaining the ball member and socket member connected together. The present invention provides these benefits.

SUMMARY OF THE INVENTION

The present invention is directed to a ball-and-socket fluid coupling having an improved retainer for retaining the ball member and socket member connected together including a redundant backup mechanism in the form of a secondary retainer structure that maintains the two members in a secured position even if the primary retention mechanism in the form of a primary retainer structure fails.

The inventive structure includes a ball body, a socket body, a primary retainer structure, an annular seal assembly and a secondary retainer structure. The ball body extends along and about a longitudinal ball body axis and has a pipe portion, a ball portion connected to the pipe portion to define a passage extending longitudinally therethrough and a support member. The support member is disposed in the passage and includes a centrally disposed tube defining a bore extending longitudinally therethrough and a plurality of web elements connecting the tube to the ball body. Further, the ball portion includes a partially spherical exterior surface having a spherical diameter.

The socket body extends along and about a longitudinal socket body axis and has a pipe section, a socket section connected to the pipe section to define a conduit extending longitudinally therethrough, and a seat member. The seat member is disposed in the conduit and includes a tubular seat defining a hole extending longitudinally therethrough and a plurality of web pieces connecting the seat to the socket body. The socket section has an opening into the conduit and an interior surface commencing from the opening and into the conduit to define a ball receiving conduit portion sized and adapted to receive the ball portion of the ball body.

The primary retainer structure includes a shaft extending longitudinally through the bore and the hole and selectively secures the support member and the seat member together while permitting the ball body and the socket body to articulate relative to each other. The annular seal assembly is disposed between and in contact with the partially spherical exterior surface of the ball portion and the interior surface of the socket body. The secondary retainer structure includes an annular member disposed in the ball receiving conduit portion and connected to the socket body at or adjacent to the opening. The secondary retainer structure has an inner secondary retainer diameter less than the spherical diameter of the partially spherical exterior surface when connected to the socket body.

The various advantages of the present invention will be better appreciated in view of the detailed description of the exemplary embodiments of the present invention.

BRIEF DESCRIPTION OF THE DRAWINGS

Some of the embodiments of the present invention are described with references to the following figures:

FIG. 7 is an exploded perspective view of a second exemplary embodiment of the ball-and-socket fluid coupling of the present invention;

FIG. 8 is a top planar view of an assembled second exemplary embodiment of the ball-and-socket fluid coupling of the present invention; and FIG. 9 is an enlarged partial side elevational view of an rotation restraining structure.

DETAILED DESCRIPTION OF THE EXEMPLARY EMBODIMENTS

Figure 1:
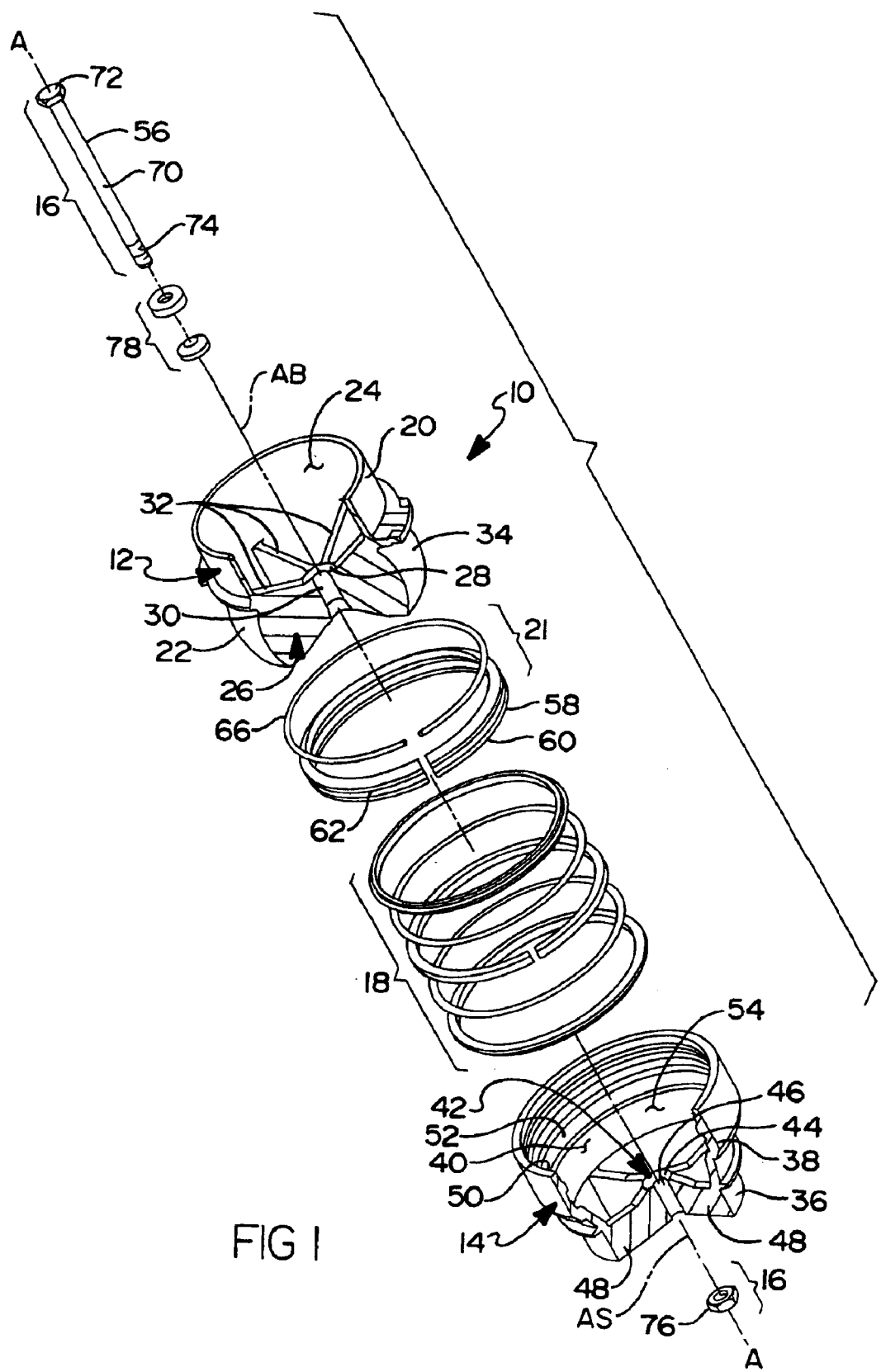
FIG. 1 is an exploded perspective view shown partially broken away of a first exemplary embodiment of a ball-and-socket fluid coupling of the present invention.
Figure 2:
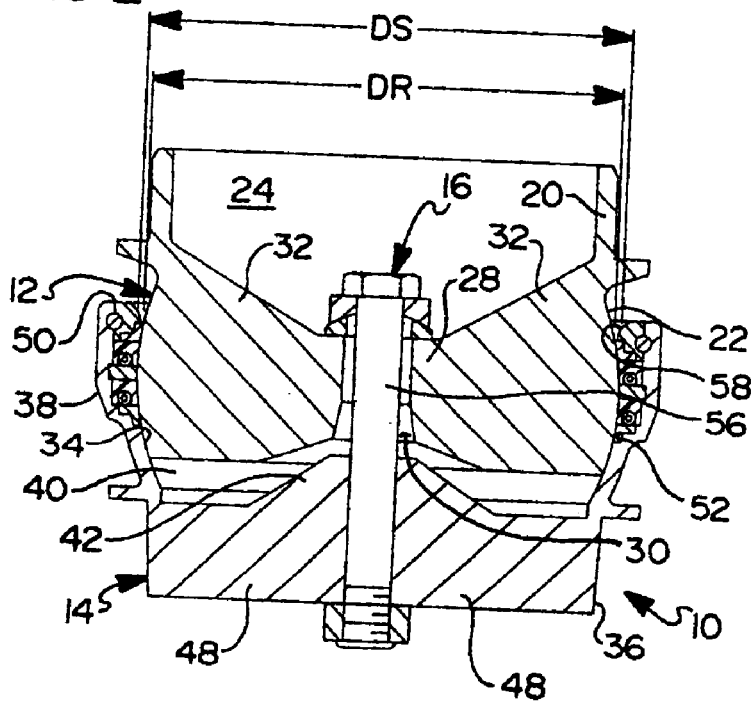
FIG. 2 is a side elevational view shown substantially in cross-section of the first exemplary embodiment of the present invention in its assembled state.
Figure 5:
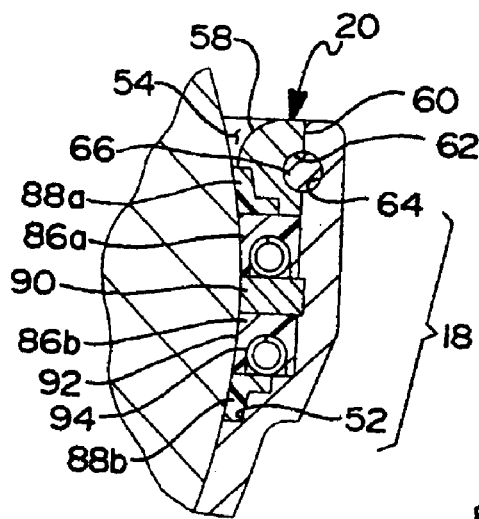
FIG. 5 is an enlarged cross-sectional view of a secondary retainer structure and an annular seal assembly disposed between a ball body and a socket body of the first exemplary embodiment of the ball-and-socket fluid coupling of the present invention.
Figure 4:
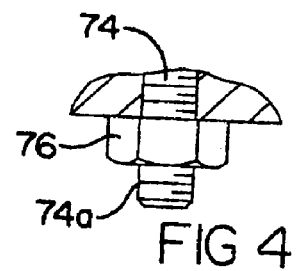
FIG. 4 is an enlarged side elevational view shown partially in cross-section of the nut threadably engaged with the threaded end portion of the bolt.

A first exemplary embodiment of a ball-and-socket fluid coupling 10 of the present invention is hereinafter described with reference to FIGS. 1–6. As best shown in FIGS. 1, 2 and 5, the ball-and-socket fluid coupling 10 of the present invention includes a ball body 12, a socket body 14, a primary retainer structure 16, an annular seal assembly 18 and a secondary retainer structure 21.

In FIGS. 1 and 2, the ball body 12 extends along and about a longitudinal ball body axis AB. In the exploded perspective view of FIG. 1, axis AB is coaxial with overall axis AA. The ball body 12 has a pipe portion 20, a ball portion 22 connected to the pipe portion 20 to define a passage 24 extending longitudinally therethrough and a support member 26. The support member 26 is disposed in the passage 24 and includes a centrally disposed tube 28 defining a bore 30 extending longitudinally therethrough and a plurality of web elements 32 connecting the tube 28 to the ball body 12. For the first exemplary embodiment of the ball-and-socket fluid coupling 10 of the present invention, the web elements 32 connect the tube 28 to the ball portion 22 of the ball body 12. The ball portion 22 has a partially spherical exterior surface 34 and the partially spherical exterior surface 34 has a spherical diameter DS as best shown in FIG. 2.

With reference to FIGS. 1 and 2, the socket body 14 extends along and about a longitudinal socket body axis AS, shown coaxial with overall axis AA in FIG. 1. In operation, body axis AS and AB may not be coaxial. Socket body 14 has a pipe section 36, a socket section 38 connected to the pipe section 36 to define a conduit 40 extending longitudinally therethrough and a seat member 42. The seat member 42 is disposed in the conduit 40 and includes a tubular seat 44 defining a hole 46 extending longitudinally therethrough and a plurality of web pieces 48 connecting the seat 44 to the socket body 14. For the first exemplary embodiment of the ball-and-socket fluid coupling 10 of the present invention, the plurality of web pieces 48 connect the seat 44 interiorly the pipe section 36 of the socket body 14. The socket section 38 has an opening 50 into the conduit 40. The socket section 38 also has an interior surface 52 commencing from the opening 50 and into the conduit 40 to define a ball receiving conduit portion 54 as shown in FIG. 1. The ball receiving conduit portion 54 is sized and adapted to receive the ball portion 22 of the ball body 12.

Again, with reference to FIGS. 1 and 2, the primary retainer structure 16 has a shaft 56 extending longitudinally through both the bore 30 and the hole 46. The primary retainer structure 16 is operative and adapted to secure the support member 26 and the seat member 42 together while permitting the ball body 12 and the socket body 14 to articulate relative to each other. The annular seal assembly 18 is disposed between and in contact with the partially spherical exterior surface 34 of the ball portion 22 and the interior surface 52 of the socket body 14.

The secondary retainer structure 21 includes an annular member 58 disposed in the ball receiving conduit portion 54 and connected to the socket body 15 at or adjacent to the opening 50. Further, the secondary retainer structure 21 has an inner secondary retainer diameter DR less than the spherical diameter DS of the partially spherical exterior surface 34 when connected to the socket body 14 as the shown in FIG. 2. As would be appreciated by one of ordinary skill in the art, the secondary retainer structure 21 is disposed on the "back" of the partially spherical exterior surface 34 so that in the event of a sufficient failure of the primary retainer structure 16, the secondary retainer structure 21 will independently secure the ball body 12 and the socket body 14 together so that the ball-and-socket fluid coupling 10 of the present invention will continue normal operation.

As best illustrated in FIG. 2, when the support member 26 and the seat member 42 are connected together resulting in an assembled ball-and-socket fluid coupling 10 of the present invention, the annular member 58 is disposed apart from and adjacent to the partially spherical exterior surface 34 of the ball portion 22. The annular member 58, however, is engagable with the partially spherical exterior surface 34 to permit the ball body 12 and the socket body 14 to articulate relative to each other. When the support member 26 and the seat member 42 are connected together, the annular member 58 is disposed longitudinally between the opening 50 and the annular seal assembly 18.

With reference to FIGS. 1 and 5, the annular member 58 has an outer circumferential surface 60 formed with an annular member groove 62 therein for the reasons discussed below. Although not by way of limitation, the annular member 58 can be a split ring as best illustrated in FIG. 1.

As shown in FIG. 5, the interior surface 52 of the socket section 38 is formed with a circumferentially-extending, wire-receiving groove 64 facing the ball receiving conduit portion 54 The secondary retainer structure 21 includes a wire 66 sized for insertion between the annular member groove 62 and wire-receiving groove 64 when the annular member groove 62 and the wire-receiving groove 64 are in facial registration with one another to fixedly connect the annular member 58 to the socket section 38 interiorly of the ball receiving conduit portion 54 when inserted therein. As shown in FIG. 1, a slot 68 extending in a circumferential direction is formed into the socket section 38 near the opening 50 and is sized to receive the wire 66. When the annular member 58 is disposed in the ball receiving conduit portion 54 with its annular member groove 62 in facial registration with the wire-receiving groove 64, the wire 66 is inserted through the slot 68 to occupy both the annular member groove 62 and the wire-receiving groove 64 thereby connecting the annular member 58 to the socket section 38 of the socket body 14. One of ordinary skill in the art would appreciate that other means are available to connect the annular member 58 to the socket section 38 of the socket body 14 such as by conventional fasteners.

Figure 6:
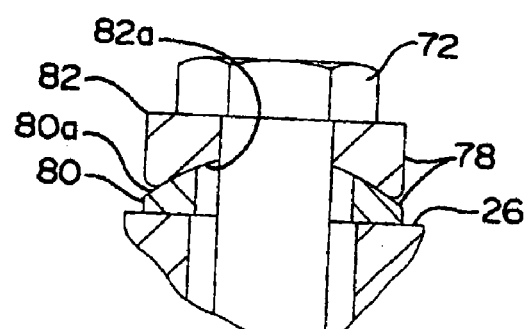
FIG. 6 is an enlarged elevational view shown partially in cross-section of a headed end portion of the bolt extending through an articulation structure and into a bore defined by a support structure disposed in a passage of a ball body.

By way of example only and not by way of limitation, the primary retainer structure 16 includes a bolt 70 having a head 72 and a threaded shaft 74 and a nut 76 sized for threadable engagement with the threaded shaft 74 as the shown in FIG. 1. As best illustrated in FIG. 6, the primary retainer structure 16 includes an articulation structure 78 disposed between the head 72 of the bolt 70 and the support member 26. The articulation structure 78 has a first annular articulation element 80 formed with a dome-shaped portion 80a and a second annular articulation element 82 formed with a concavity 82a sized and adapted to receive the dome-shaped portion 80a of the first annular articulation element 80. As is commonly known in the art, the first and second annular articulation element 80 and 82 co-operate with one another so that the ball body 12 and the socket body 14 can articulate relative to each other when the primary retainer structure 16 connects the ball body 12 and the socket body 14 together. One of ordinary skill in the art would appreciate that other components for retainer structures are commonly known that secure the ball body and socket body together while permitting the ball body and the socket body to articulate relative to each other.

Figure 3:
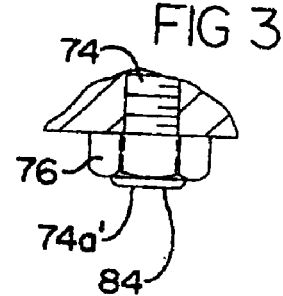
FIG. 3 is an enlarged side elevational view shown partially in cross-section of a nut threadably engaged with a threaded end portion of a bolt with a deformed portion of the bolt forming a flange in contact with the nut.

Furthermore, as the shown in FIG. 3, the primary retainer structure 16 includes a flange 84 that is connected to an end portion 74a of the threaded shaft 74. The flange 84 contacts the nut 76 for preventing the nut 76 from disengaging the threaded shaft 74. While not required for the first exemplary embodiment of the ball-and-socket fluid coupling 10 of the present invention, the flange 84 is a deformed end portion 74a' of the threaded shaft 74. However, a skilled artisan would appreciate that the flange can also be, for example, a flat metal disk fastened to the end portion 74a of the threaded shaft 74 by a weldment.

Again, with reference to FIG. 5, the annular seal assembly 18 includes a pair of annular seal elements 86a and 86b, a pair of annular scrapers 88a and 88b and a split ring divider 90. The split ring divider 90 is disposed between and in contact with the pair of annular seal elements 86a and 86b. The annular scraper 88a is disposed between and in contact with the secondary retainer structure 21 and the annular seal element 86a. The other annular scraper 88b is in contact with the other annular seal element 86b such that the other annular seal element 86b is disposed between and in contact with the split ring divider 90 and the other annular scraper 88b.

However, one of ordinary skill in the art would appreciate that other arrangements of an annular seal assembly can be used. For instance, it is preferred that the annular seal assembly includes at least one annular seal element. Further, it is also preferred that the annular seal assembly includes at least one annular scraper such that the at least one annular scraper is disposed between and in contact with the secondary retainer structure and the at least one annular seal element.

While not required, the at least one annular seal element is typically a conventional spring seal having an elastomeric U-shaped member 92 forming a U-shaped channel with a metallic, toroidal spring 94 contained within the U-shaped channel as best shown in FIG. 5. A skilled artisan would appreciate that other types of conventional spring seals as well as other types of springs therein can be used for the annular seal element.

A second exemplary embodiment of a ball-and-socket fluid coupling 110 of the present invention is illustrated in FIGS. 7–9. The second exemplary embodiment of the ball-and-socket fluid coupling 110 of the present invention is identical with the first exemplary embodiment except that the second exemplary embodiment includes an rotation restraining structure 112. The rotation restraining structure 112 has a pair of forked restraint members 114 disposed opposite one another and connected to the socket section 38. It also includes a pair of stop tabs 116 disposed opposite one another and connected to and projecting radially outwardly from a circumferential flange 118 extending circumferentially about the ball portion 22. Each one of the pair of forked restraint members 114 defines a generally V-shaped opening 120 that is sized to receive a respective one of the stop tabs 116 when the support member 26 and the seat member 42 are connected together. Respective ones of the stop tabs 116 are freely movable within the respective ones of the generally V-shaped openings 120 as depicted by the arrows in FIG. 9.

Each one of the pair of forked restraint members includes a pair of prongs 112 that extend radially and longitudinally. Each respective pair of prongs 112, 112 at least partially define the generally V-shaped opening 120. The respective stop tabs 116 are restrained from movement upon contact with either one of the pair of prongs 112, 112 of the respective forked restraint members 114 thereby restraining relative rotational and/or articulating movement of the ball body and the socket body.

One of ordinary skill in the art would appreciate that the exemplary embodiments of the ball-and-socket fluid couplings provides an improved retainer structure for retaining the ball member and socket member together. Further, ball-and-socket fluid couplings of the present invention provide a redundant retainer structure for retaining the ball member and socket member together. More specifically, the redundant retainer structure includes the primary retainer structure and the secondary retainer structure described above. As a result of the redundant retainer structure, the ball member and socket member will be retained in their connected manner together in the event of catastrophic failure of a primary retainer structure.

The present invention, may, however, be embodied in various different forms and should not be construed as limited to the exemplary embodiments set forth herein; rather, these exemplary embodiments are provided so that this disclosure will be thorough and complete and will fully convey the scope of the present invention to those skilled in the art.

What is claimed is:

1. A ball-and-socket fluid coupling, comprising:
    a ball body defining a passage extending therethrough;
    a socket body defining a conduit extending therethrough and having an opening into the conduit sized to receive the ball body;
    a primary retainer disposed in the passage and the conduit for securing the ball body and the socket body together while permitting the ball body and the socket body to articulate relative to each other; and
    a secondary retainer at least substantially surrounding the ball body and disposed apart from and adjacent to the ball body in the conduit between the ball body and the socket body.

2. A ball-and-socket fluid coupling according to claim 1, wherein the secondary retainer includes an annular member disposed at or adjacent to the opening.

3. A ball-and-socket fluid coupling according to claim 2, wherein the annular member defines an inner diameter and the ball body defines an outer diameter, the inner diameter being less than the outer diameter.

4. A ball-and-socket fluid coupling according to claim 2, wherein the annular member is connected to the socket body.

5. A ball-and-socket fluid coupling according to claim 1, wherein the primary retainer includes a bolt and a nut threaded onto the bolt.

6. A ball-and-socket fluid coupling according to claim 1, further comprising an annular seal assembly disposed in the conduit between and in contact with the ball body and the socket body.

7. A ball-and-socket fluid coupling, comprising:
    a ball body extending along and about a longitudinal ball body axis and having a pipe portion, a ball portion connected to the pipe portion to define a passage extending longitudinally therethrough and a support member disposed in the passage and including a centrally disposed tube defining a bore extending longitudinally therethrough and a plurality of web elements connecting the tube to the ball body, the ball portion including a partially spherical exterior surface having a spherical diameter;
    a socket body extending along and about a longitudinal socket body axis and having a pipe section, a socket section connected to the pipe section to define a conduit extending longitudinally therethrough and a seat member disposed in the conduit and including a tubular seat defining a hole extending longitudinally therethrough and a plurality of web pieces connecting the seat to the socket body, the socket section having an opening into the conduit and an interior surface commencing from the opening and into the conduit to define a ball receiving conduit portion sized and adapted to receive the ball portion of the ball body;

a primary retainer structure having a shaft extending longitudinally through the bore and the hole and adapted to connect the support member and the seat member together while permitting the ball body and the socket body to articulate relative to each other;

an annular seal assembly disposed between and in contact with the partially spherical exterior surface of the ball portion and the interior surface of the socket body; and a secondary retainer structure including an annular member disposed apart from and adjacent to the ball body in the ball receiving conduit portion and connected to the socket body at or adjacent to the opening, the secondary retainer structure having an inner secondary retainer diameter less than the spherical diameter of the partially spherical exterior surface when connected to the socket body.

8. A ball-and-socket fluid coupling according to claim 7, wherein when the support member and the seat member are connected together, the annular member is disposed apart from and adjacent to the partially spherical exterior surface of the ball portion yet engagable with the partially spherical exterior surface to permit the ball body and the socket body to articulate relative to each other.

9. A ball-and-socket fluid coupling according to claim 8, wherein when the support member and the seat member are connected together, the annular member is disposed longitudinally between the opening and the annular seal assembly.

10. A ball-and-socket fluid coupling according to claim 7, wherein the annular member has an outer circumferential surface formed with an annular member groove therein.

11. A ball-and-socket fluid coupling according to claim 10, wherein the annular member is a split ring.

12. A ball-and-socket fluid coupling according to claim 10, wherein the interior surface of the socket section is formed with a circumferentially-extending, wire-receiving groove facing the ball receiving conduit portion and the secondary retainer structure includes a wire sized for insertion between the annular member groove and wire-receiving groove when the annular member groove and the wire-receiving groove are in facial registration with one another to fixedly connect the annular member to the socket section interiorly of the ball receiving conduit portion when inserted.

13. A ball-and-socket fluid coupling according to claim 7, wherein the primary retainer structure includes a bolt having a head and a threaded shaft and a nut sized for threadable engagement with the threaded shaft.

14. A ball-and-socket fluid coupling according to claim 13, wherein the primary retainer structure includes an articulation structure disposed between the head of the bolt and the support member, the articulation structure having a first annular articulation element formed with a dome-shaped portion and a second annular articulation element formed with a concavity sized and adapted to receive the dome-shaped portion.

15. A ball-and-socket fluid coupling according to claim 13, wherein the primary retainer structure includes a flange connected to an end portion of the threaded shaft and in contact with the nut for preventing the nut from disengaging the threaded shaft.

16. A ball-and-socket fluid coupling according to claim 15, wherein the flange is a deformed end portion of the threaded shaft.

17. A ball-and-socket fluid coupling according to claim 7, wherein the annular seal assembly includes at least one annular seal element.

18. A ball-and-socket fluid coupling according to claim 17, wherein the at least one annular seal element is a spring seal.

19. A ball-and-socket fluid coupling according to claim 17, wherein the annular seal assembly includes at least one annular scraper.

20. A ball-and-socket fluid coupling according to claim 19, wherein the at least one annular scraper is disposed between and in contact with the secondary retainer structure and the at least one annular seal element.

21. A ball-and-socket fluid coupling according to claim 7, wherein the annular seal assembly includes a pair of annular seal elements, a pair of annular scrapers and a split ring divider disposed between and in contact with the pair of annular seal elements with one of the pair of annular scrapers disposed between and in contact with the secondary retainer structure and one of the pair of the annular seal elements and a remaining one of the annular scrapers in contact with a remaining one of the annular seal elements is disposed between and in contact with the split ring divider and the remaining one of the annular scrapers.

22. A ball-and-socket fluid coupling according to claim 7, further comprising an rotation restraining structure having a pair of forked restraint members disposed opposite one another and connected to the socket section and a pair of stop tabs disposed opposite one another and connected to and projecting radially outwardly from the ball portion, each one of the pair of forked restraint members defining a generally V-shaped opening sized to receive a respective one of the stop tabs when the support member and the seat member are connected together, respective ones of the stop tabs being freely movable within the respective ones of the generally V-shaped openings.

23. A ball-and-socket fluid coupling according to claim 22, wherein each one of the pair of forked restraint members includes a pair of prongs extending radially and longitudinally and at least partially defining the generally V-shaped opening, the respective stop tabs being restrained from movement upon contact with either one of the pair of prongs of the respective forked restraint members.

24. A ball-and-socket fluid coupling, comprising:

a ball body extending along and about a longitudinal ball body axis and having a pipe portion, a ball portion connected to the pipe portion to define a passage extending longitudinally therethrough and a support member disposed in the passage and including a centrally disposed tube defining a bore extending longitudinally therethrough and a plurality of web elements connecting the tube to the ball body, the ball portion including a partially spherical exterior surface having a spherical diameter;

a socket body extending along and about a longitudinal socket body axis and having a pipe section, a socket section connected to the pipe section to define a conduit extending longitudinally therethrough and a seat member disposed in the conduit and including a tubular seat defining a hole extending longitudinally therethrough and a plurality of web pieces connecting the seat to the socket body, the socket section having an opening into the conduit and an interior surface commencing from the opening and into the conduit to define a ball receiving conduit portion sized and adapted to receive the ball portion of the ball body;

means for connecting and retaining the support member and the seat member together while permitting the ball body and the socket body to articulate relative to each other;

an annular seal assembly disposed between and in contact with the partially spherical exterior surface of the ball portion and the interior surface of the socket body; and an rotation restraining structure having a pair of forked restraint members disposed opposite one another and connected to the socket section and a pair of stop tabs disposed opposite one another and connected to and projecting radially outwardly from the ball portion, each one of the pair of forked restraint members defining a generally V-shaped opening sized to receive a respective one of the stop tabs when the support member and the seat member are connected together, respective ones of the stop tabs being freely movable within the respective ones of the generally V-shaped openings.

25. A ball-and-socket fluid coupling according to claim 24, wherein each one of the pair of forked restraint members includes a pair of prongs extending radially and longitudinally and at least partially defining the generally V-shaped opening, the respective stop tabs being restrained from movement upon contact with either one of the pair of prongs of the respective forked restraint members.

26. A ball-and-socket fluid coupling, comprising:

a ball body extending along and about a longitudinal ball body axis and having a pipe portion, a ball portion connected to the pipe portion to define a passage extending longitudinally therethrough and a support member disposed in the passage and including a centrally disposed tube defining a bore extending longitudinally therethrough and a plurality of web elements connecting the tube to the ball body, the ball portion including a partially spherical exterior surface having a spherical diameter;

a socket body extending along and about a longitudinal socket body axis and having a pipe section, a socket section connected to the pipe section to define a conduit extending longitudinally therethrough and a seat member disposed in the conduit and including a tubular seat defining a hole extending longitudinally therethrough and a plurality of web pieces connecting the seat to the socket body, the socket section having an opening into the conduit and an interior surface commencing from the opening and into the conduit to define a ball receiving conduit portion sized and adapted to receive the ball portion of the ball body;

a primary retainer structure having a shaft extending longitudinally through the bore and the hole and adapted to connect the support member and the seat member together while permitting the ball body and the socket body to articulate relative to each other;

an annular seal assembly disposed between and in contact with the partially spherical exterior surface of the ball portion and the interior surface of the socket body;

a secondary retainer structure including an annular member disposed in the ball receiving conduit portion and connected to the socket body at or adjacent to the opening, the secondary retainer structure having an inner secondary retainer diameter less than the spherical diameter of the partially spherical exterior surface when connected to the socket body; and wherein the inferior surface of the socket is formed with a circumferentially-extending, wire-receiving groove facing the ball receiving conduit portion and the secondary retainer structure includes a wire sized for insertion between the annular member groove and wire-receiving groove when the annular member groove and the wire-receiving groove are in facial registration with one another to fixedly connect the annular member to the socket section interiorly of the ball receiving conduit portion when inserted.

27. A ball-and-socket fluid coupling, comprising:

a ball body extending along and about a longitudinal ball body axis and having a pipe portion, a ball portion connected to the pipe portion to define a passage extending longitudinally therethrough and a support member disposed in the passage and including a centrally disposed tube defining a bore extending longitudinally therethrough and a plurality of web elements connecting the tube to the ball body, the ball portion including a partially spherical exterior surface having a spherical diameter;

a socket body extending along and about a longitudinal socket body axis and having a pipe section, a socket section connected to the pipe section to define a conduit extending longitudinally therethrough and a seat disposed in the conduit and including a tubular seat defining a hole extending longitudinally therethrough and a plurality of web pieces connecting the seat to the socket body, the socket section having an opening into the conduit and an interior surface commencing from the opening and into the conduit to define a ball receiving conduit portion sized and adapted to receive the ball portion of the ball body;

a primary retainer structure having a shaft extending longitudinally through the bore and the hole and adapted to connect the support member and the seat member together while permitting the ball body and the socket body to articulate relative to each other;

an annular seal assembly disposed between and in contact with the partially spherical exterior surface of the ball portion and the interior surface of the socket body;

a secondary retainer structure including an annular member disposed in the ball receiving conduit portion and connected to the socket body at or adjacent to the opening, the secondary retainer structure having an inner secondary retainer diameter less than the spherical diameter of the partially spherical exterior surface when connected to the socket body; and wherein the annular seal assembly includes a pair of annular seal elements, a pair of annular scrapers and a split ring divider disposed between and in contact with the pair of annular seal elements with one of the pair of annular scrapers disposed between and in contact with the secondary retainer structure and one of the pair of the annular seal elements and a remaining one of the annular scrapers in contact with a remaining one of the annular seal elements is disposed between and in contact with the split ring divider and the remaining one of the annular scrapers.

28. A ball-and-socket fluid coupling, comprising:

a ball body extending along and about a longitudinal ball body axis and having a pipe portion, a ball portion connected to the pipe portion to define a passage extending longitudinally therethrough and a support member disposed in the passage and including a centrally disposed tube defining a bore extending longitudinally therethrough and a plurality of web elements connecting the tube to the ball body, the ball portion including a partially spherical exterior surface having a spherical diameter;

a socket body extending along and about a longitudinal socket body axis and having a pipe section, a socket section connected to the pipe section to define a conduit extending longitudinally therethrough and a seat member disposed in the conduit and including a tubular seat defining a hole extending longitudinally therethrough and a plurality of web pieces connecting the seat to the socket body, the socket section having an opening into the conduit and an interior surface commencing from the opening and into the conduit to define a ball receiving conduit portion sized and adapted to receive the ball portion of the ball body;

a primary retainer structure having a shaft extending longitudinally through the bore and the hole and adapted to connect the support member and the seat member together while permitting the ball body and the socket body to articulate relative to each other;

an annular seal assembly disposed between and in contact with the partially spherical exterior surface of the ball portion and the interior surface of the socket body;

a secondary retainer structure including an annular member disposed in the ball receiving conduit portion and connected to the socket body at or adjacent to the opening, the secondary retainer structure having an inner secondary retainer diameter less than the spherical diameter of the partially spherical exterior surface when connected to the socket body; and a rotation restraining structure having a pair of forked restraint members disposed opposite one another and connected to the socket section and a pair of stop tabs disposed opposite one another and connected to and projecting radially outwardly from the ball portion, each one of the pair of forked restraint members defining a generally V-shaped opening sized to receive a respective one of the stop tabs when the support member and the seat member are connected together, respective ones of the stop tabs being freely movable within the respective ones of the generally V-shaped openings.

29. A ball-and-socket fluid coupling according to claim 27, wherein each one of the pair of forked restraint members includes a pair of prongs extending radially and longitudinally and at least partially defining the generally V-shaped opening, the respective stop tabs being restrained from movement upon contact with either one of the pairs of prongs of the respective forked restraint members.

* * * * *